(12) United States Patent
Choi et al.

(10) Patent No.: US 12,263,785 B2
(45) Date of Patent: Apr. 1, 2025

(54) MEDIA MODULE, METHOD OF CONTROLLING MEDIA MODULE, AND VEHICLE INCLUDING MEDIA MODULE

(71) Applicant: HYUNDAI MOBIS CO., LTD., Seoul (KR)

(72) Inventors: Ban Suk Choi, Yongin-si (KR); Hyoung Jin Choi, Yongin-si (KR); Jun Hyuk Cha, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 27 days.

(21) Appl. No.: 18/359,124

(22) Filed: Jul. 26, 2023

(65) Prior Publication Data

US 2024/0190336 A1     Jun. 13, 2024

(30) Foreign Application Priority Data

Dec. 12, 2022   (KR) .................... 10-2022-0172627

(51) Int. Cl.
*B60Q 1/52*     (2006.01)
*B60Q 1/50*     (2006.01)
*B60Q 5/00*     (2006.01)
*F21S 43/30*    (2018.01)

(52) U.S. Cl.
CPC ............. *B60Q 1/525* (2013.01); *B60Q 5/006* (2013.01); *F21S 43/30* (2018.01); *B60Q 2300/40* (2013.01)

(58) Field of Classification Search
CPC ........ B60Q 1/525; B60Q 5/006; B60Q 9/007; F21S 43/30
See application file for complete search history.

(56) References Cited

U.S. PATENT DOCUMENTS

| | | | |
|---|---|---|---|
| 2002/0128754 A1* | 9/2002 | Sakiyama | B62D 15/0275 701/1 |
| 2018/0174460 A1* | 6/2018 | Jung | G08G 1/166 |
| 2023/0406192 A1* | 12/2023 | Choi | B60Q 1/02 |

FOREIGN PATENT DOCUMENTS

| | | | | |
|---|---|---|---|---|
| DE | 4440583 A1 * | 5/1996 | | F21S 6/005 |
| JP | 2012-162228 A | 8/2012 | | |
| JP | 2014-052883 A | 3/2014 | | |
| KR | 20-0273368 Y1 | 4/2002 | | |
| KR | 10-1789652 B1 | 10/2017 | | |

OTHER PUBLICATIONS

Office Action issued on Nov. 6, 2024 in the corresponding Korean Patent Application No. 10-2022-0172627.

* cited by examiner

*Primary Examiner* — Julie A Bannan
(74) *Attorney, Agent, or Firm* — NovoTechIP International PLLC

(57) ABSTRACT

A media module may include a module gear unit rotatably installed in a vehicle body; a reflection plate connected to the module gear unit; a light-emitting device disposed to face a reflection surface of the reflection plate; and a speaker disposed to face the reflection surface of the reflection plate, wherein light generated by the light-emitting device is incident toward the reflection plate, and a sound generated by the speaker is incident toward the reflection plate.

13 Claims, 13 Drawing Sheets

MEDIA MODULE, METHOD OF CONTROLLING MEDIA MODULE, AND VEHICLE INCLUDING MEDIA MODULE

CROSS-REFERENCE TO RELATED APPLICATIONS

This application claims the benefit under 35 U.S.C. § 119(a) of priority to Korean Patent Application No. 10-2022-0172627 filed on Dec. 12, 2022 in the Korean Intellectual Property Office, the entire disclosure of which is incorporated herein by reference for all purposes.

TECHNICAL FIELD

Exemplary embodiments of the present disclosure relate to a media module, a method of controlling the media module, and a vehicle including the media module, and more particularly, to a media module capable of transferring visual and/or audible signals to a pedestrian, a method of controlling the media module, and a vehicle including the media module.

BACKGROUND

In general, various types of lighting devices for easily checking an object disposed around a vehicle when the vehicle travels and notifying a surrounding vehicle or a pedestrian of a state of the vehicle or transferring a signal to a surrounding vehicle or a pedestrian are installed in the vehicle.

However, a common lighting device has problems in that the type of a signal which may be transmitted is limited because the signal is transferred through only the turn-on and turn-off of an LED and it is difficult to transfer a clear and accurate signal because only a rather flat image can be transmitted. Furthermore, in the daytime in which an illuminance value outside a vehicle is high, the common lighting device has a problem in that visibility is low in the transfer of a signal by only the turn-on and turn-off of an LED.

The Background technology of the present disclosure was disclosed in Korean Patent No. 10-1789652 (registered on Oct. 18, 2017 and entitled "LED LAMP OF A VEHICLE").

SUMMARY

Various embodiments are directed to a media module capable of transmitting a lighting signal and an acoustic signal which may be directed toward a pedestrian, a method of controlling the media module, and a vehicle including the media module.

However, an object to be solved by the present disclosure is not limited to the aforementioned object, and may be variously extended without departing from the spirit and scope of the present disclosure.

In an embodiment, a media module may include a module gear unit rotatably installed in a vehicle body, a reflection plate connected to the module gear unit, a light-emitting device disposed to face a reflection surface of the reflection plate, and a speaker disposed to face the reflection surface of the reflection plate, wherein light generated by the light-emitting device may be incident toward the reflection plate, and a sound generated by the speaker may be incident toward the reflection plate.

The media module may further include a rotation gear engaged with the module gear unit and configured to provide a rotational movement to the module gear unit.

A first incident angle that is formed by the light that is incident toward the reflection plate and a normal of the reflection plate may be different from a second incident angle that is formed by the sound that is incident toward the reflection plate and the normal of the reflection plate.

The first incident angle may be smaller than the second incident angle.

An internal surface of the reflection plate by which the light and the sound are reflected may be formed to have a curved surface.

The reflection plate may be rotatable with respect to the module gear unit.

The light-emitting device and the speaker may be rotatable with respect to the reflection plate.

The light-emitting device and the speaker may be movable with respect to the reflection plate.

The media module may further include a sensor configured to measure a location of a pedestrian around a vehicle and a controller configured to control a rotational operation of the module gear unit based on information on the location of the pedestrian, which has been measured by the sensor.

In an embodiment, a method of controlling a media module may include checking, by a sensor, a location of a pedestrian around a vehicle, aligning the media module and the pedestrian based on information on the location of the pedestrian, which has been measured by the sensor, so that the media module is directed toward the pedestrian, and controlling the media module to transmit at least one of light and a sound toward the pedestrian.

The media module may include a module gear unit rotatably installed in a vehicle body, a reflection plate connected to the module gear unit, a light-emitting device disposed to face a reflection surface of the reflection plate, and a speaker disposed to face the reflection surface of the reflection plate, wherein the light generated by the light-emitting device may be incident toward the reflection plate, and the sound generated by the speaker may be incident toward the reflection plate.

The media module may further include a controller configured to control a rotational operation of the module gear unit. The aligning of the media module and the pedestrian so that the media module is directed toward the pedestrian may include rotating, by the controller, the module gear unit so that at least one of the light reflected by the reflection plate and the sound reflected by the reflection plate is directed toward the pedestrian.

A first incident angle that is formed by the light that is incident toward the reflection plate and a normal of the reflection plate may be different from a second incident angle that is formed by the sound that is incident toward the reflection plate and the normal of the reflection plate.

The aligning of the media module and the pedestrian so that the media module is directed toward the pedestrian may further include rotating, by the controller, the reflection plate with respect to the module gear unit.

The aligning of the media module and the pedestrian so that the media module is directed toward the pedestrian may further include rotating, by the controller, the light-emitting device and the speaker with respect to the reflection plate.

In an embodiment, a vehicle may include a media module. The media module may include a module gear unit rotatably installed in a vehicle body, a reflection plate connected to the module gear unit, a light-emitting device disposed to face a reflection surface of the reflection plate, a speaker disposed to face the reflection surface of the reflection plate, a sensor configured to measure a location of a pedestrian around a vehicle, and a controller configured to control a rotational operation of the module gear unit based on information on the location of the pedestrian, which has been measured by the sensor, wherein at least one of light and a sound may be transmitted toward the pedestrian by controlling the media module.

According to the present disclosure, the media module can accurately transfer a signal of a vehicle to a targeted pedestrian because the media module transmits light and/or a sound toward the targeted pedestrian. Accordingly, driving stability can be improved and the safety of a pedestrian can be secured, through communication between the vehicle and the pedestrian.

According to the present disclosure, image pollution and/or noise pollution may not act on another pedestrian that is not a target because a signal of a vehicle can be transferred to a targeted pedestrian in the form of light and/or a sound.

DETAILED DESCRIPTION

Figure 1:
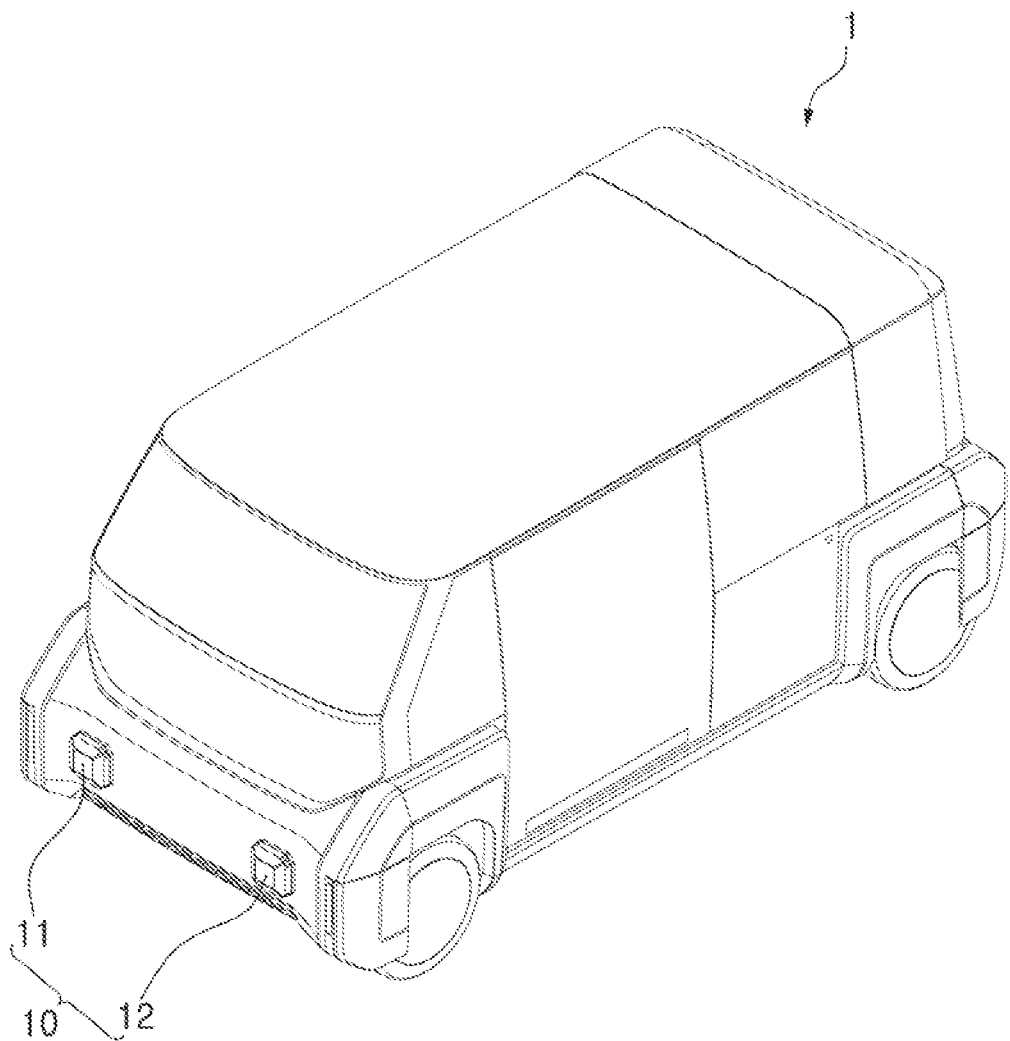
FIG. 1 is a perspective view of a vehicle including a media module according to an embodiment of the present disclosure.

Hereinafter, a media module, a method of controlling the media module, and a vehicle including the media module will be described below with reference to the accompanying drawings through various exemplary embodiments.

In this process, the thicknesses of lines or the sizes of elements illustrated in the drawings may have been exaggerated for the clarity of a description and for convenience' sake. Furthermore, terms to be described below have been defined by taking into consideration their functions in the present disclosure, and may be changed depending on a user or operator's intention or practice. Accordingly, such terms should be defined based on the overall contents of this specification.

Furthermore, throughout the specification, when it is described that one part is "connected (or coupled)" to another part, the one part may be "directly connected (or coupled)" to the another part or may be "indirectly connected (or coupled)" to the another part with another member interposed therebetween. When it is said that one component "includes (or comprises)" the other element, this means that the one component may further "include (or comprise)" another element not the exclusion of another element unless explicitly described to the contrary.

Furthermore, throughout this specification, the same reference numerals may denote the same elements. Although not mentioned or described in a specific drawing, the same reference numerals or similar reference numerals may be described on the basis of another drawing. Furthermore, although a reference numeral is not indicated in a portion of a specific drawing, the portion may be described on the basis of another drawing. Furthermore, the number, shapes, and sizes of detailed elements included in the drawings of this application, a relative difference between the sizes, etc. have been set for convenience of understanding, and do not limit embodiments, and may be implemented in various forms.

Figure 2:
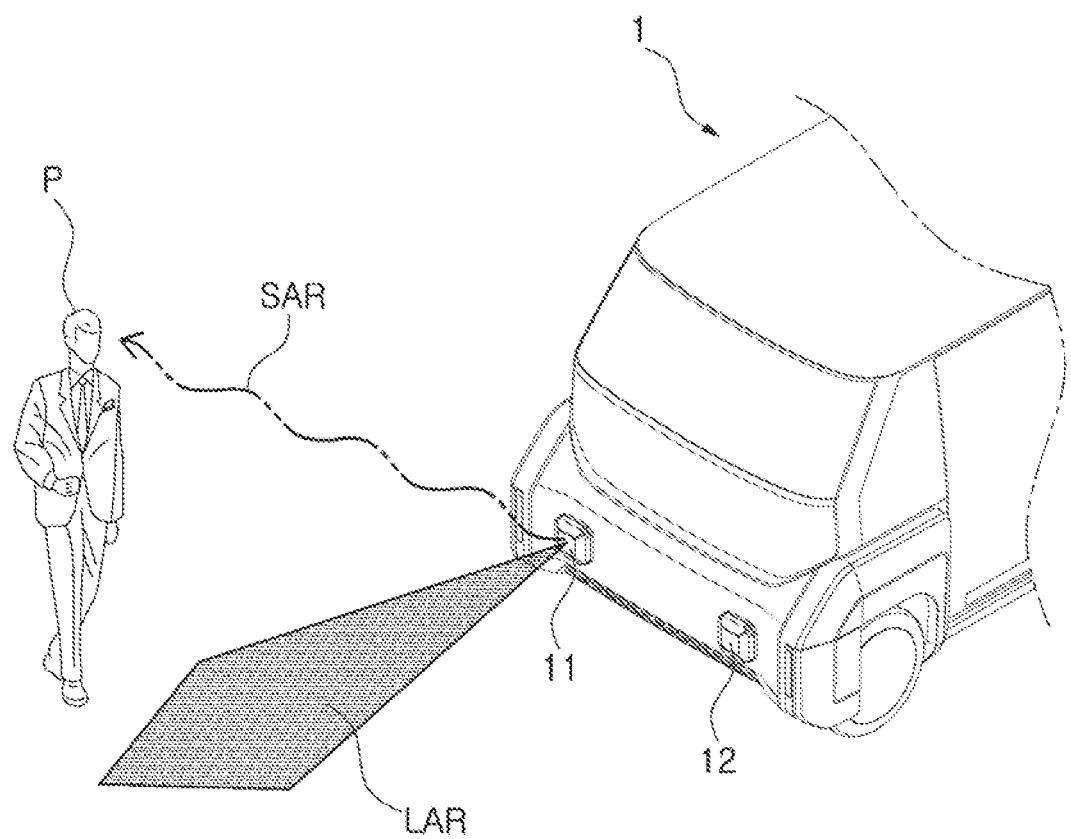
FIG. 2 is a perspective view illustrating the state in which a pedestrian is present around the vehicle according to an embodiment of the present disclosure.
Figure 3:
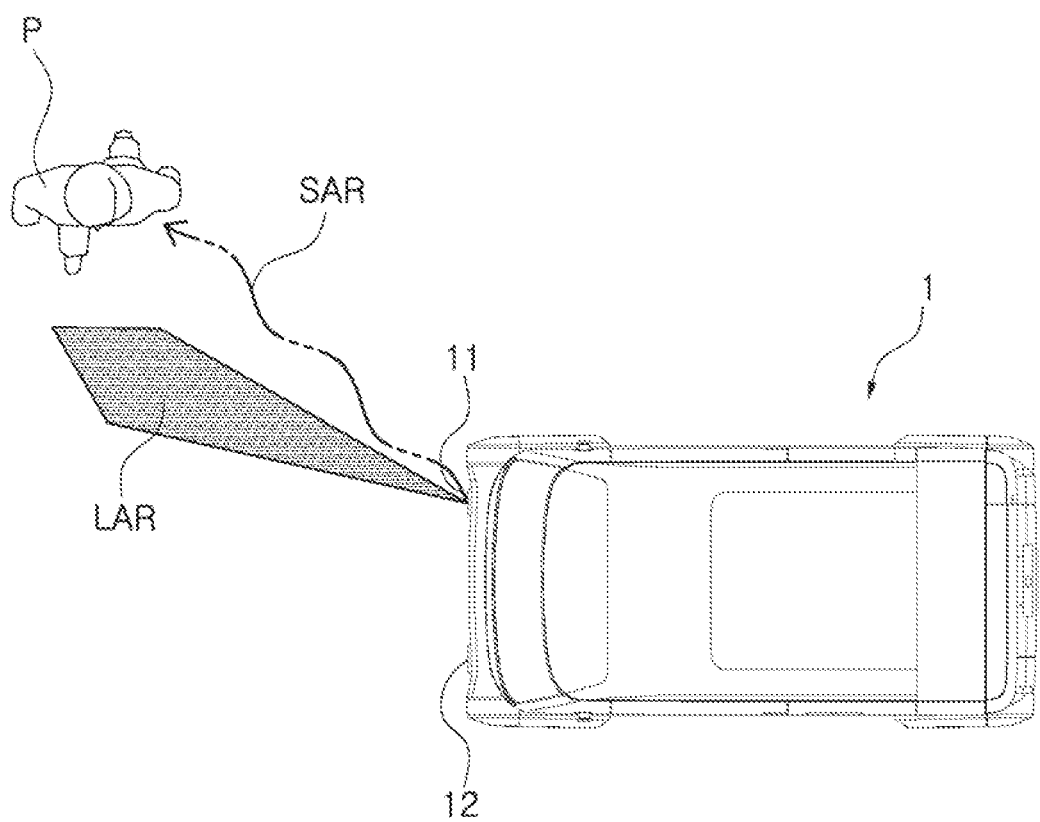
FIG. 3 is a plan view illustrating the state in which a pedestrian is present around the vehicle according to an embodiment of the present disclosure.
Figure 4:
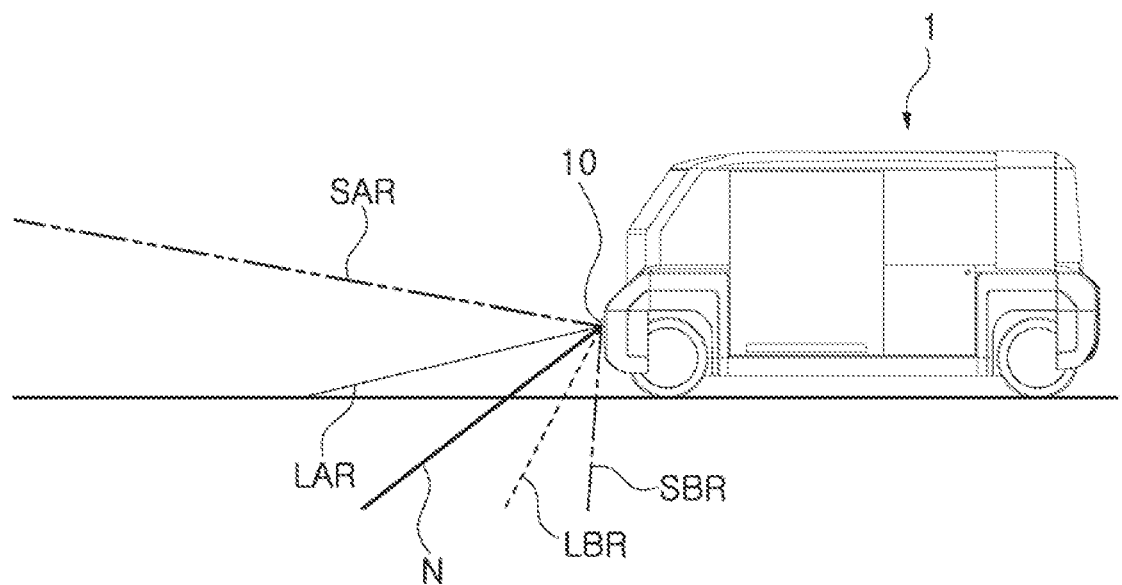
FIG. 4 is a side view of the vehicle according to an embodiment of the present disclosure.
Figure 5:
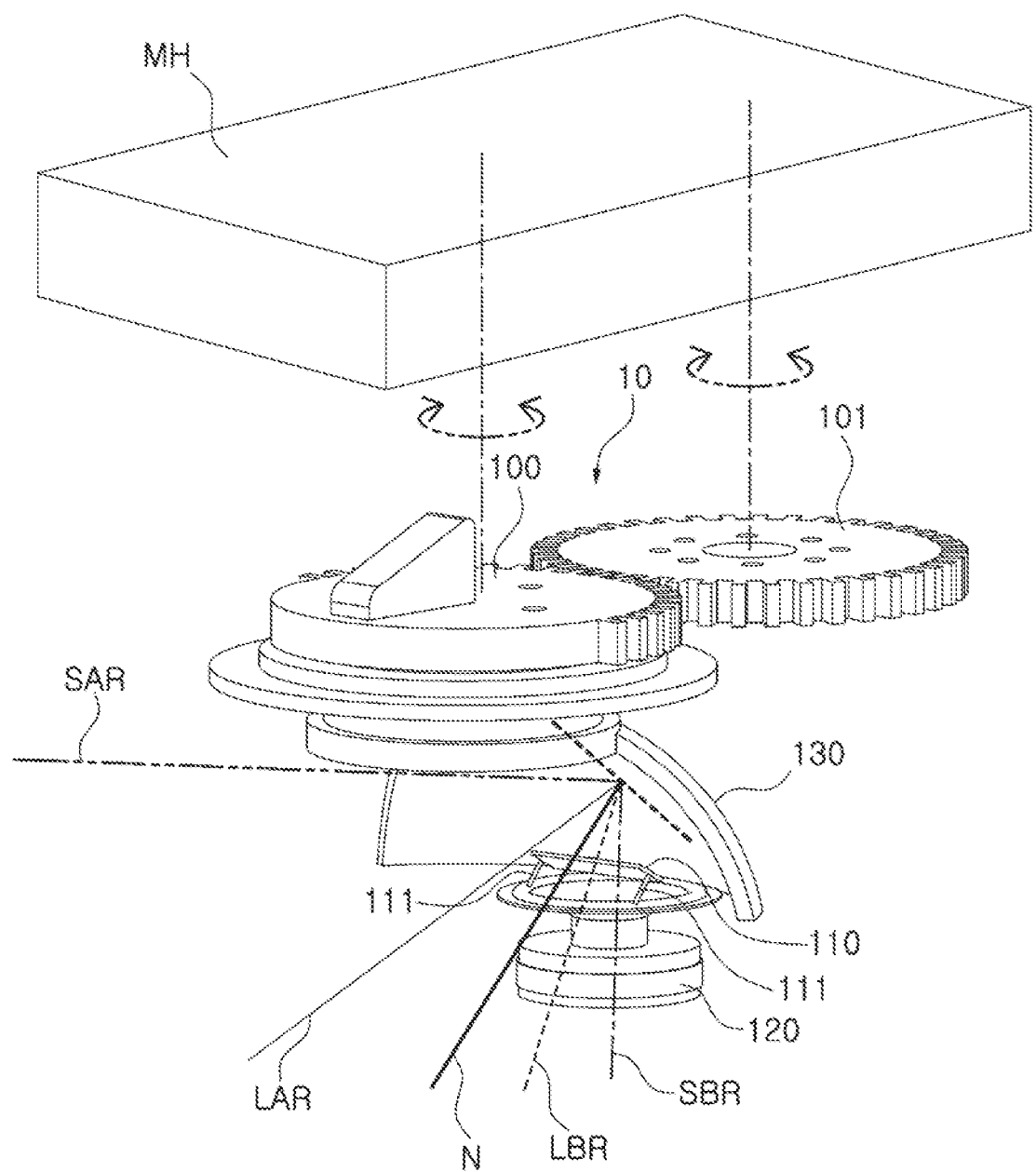
FIG. 5 is a perspective view of the media module according to an embodiment of the present disclosure.
Figure 6:
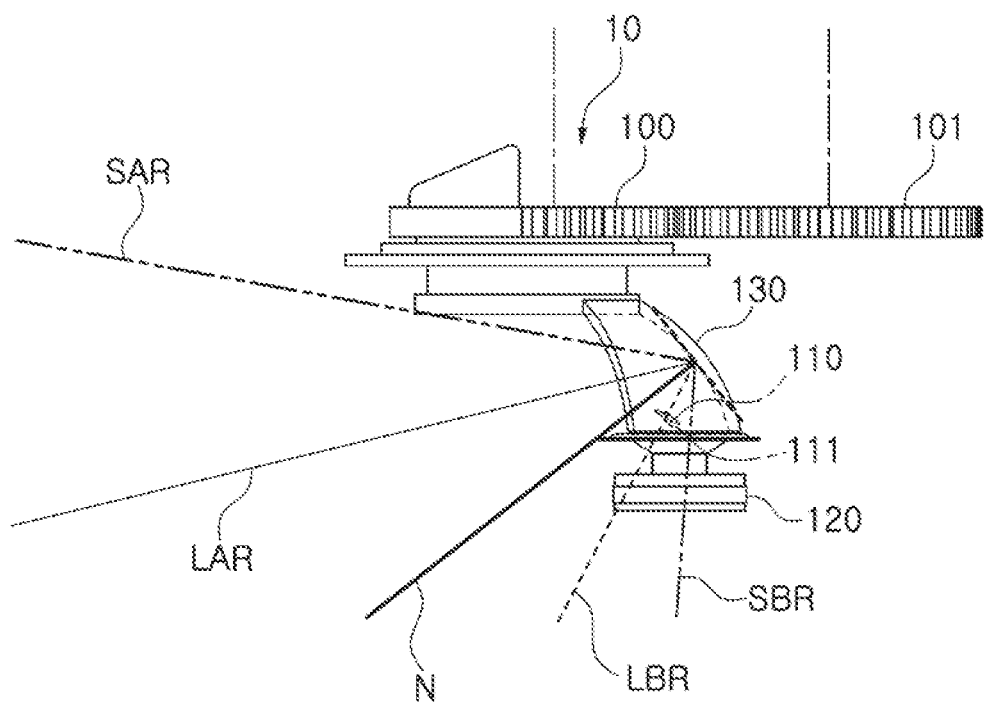
FIG. 6 is a side view of the media module according to an embodiment of the present disclosure.
Figure 7:
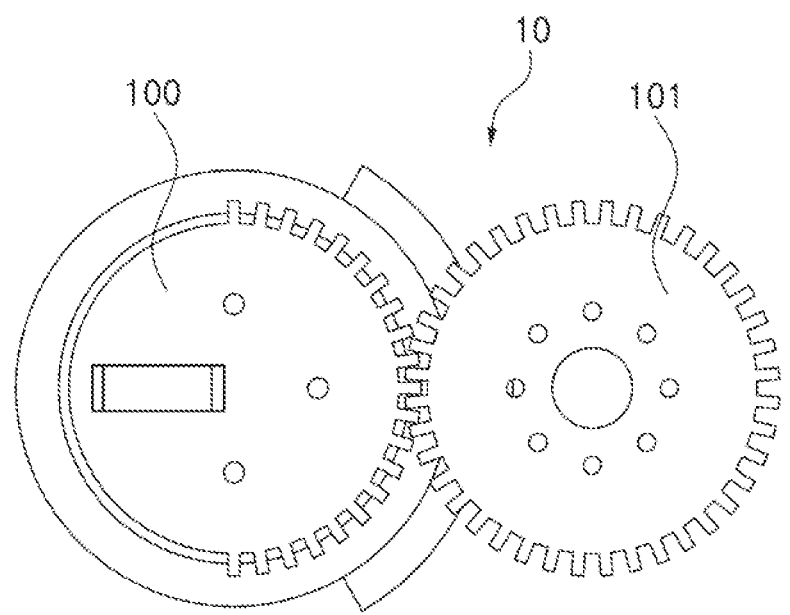
FIG. 7 is a plan view of the media module according to an embodiment of the present disclosure.
Figure 8:
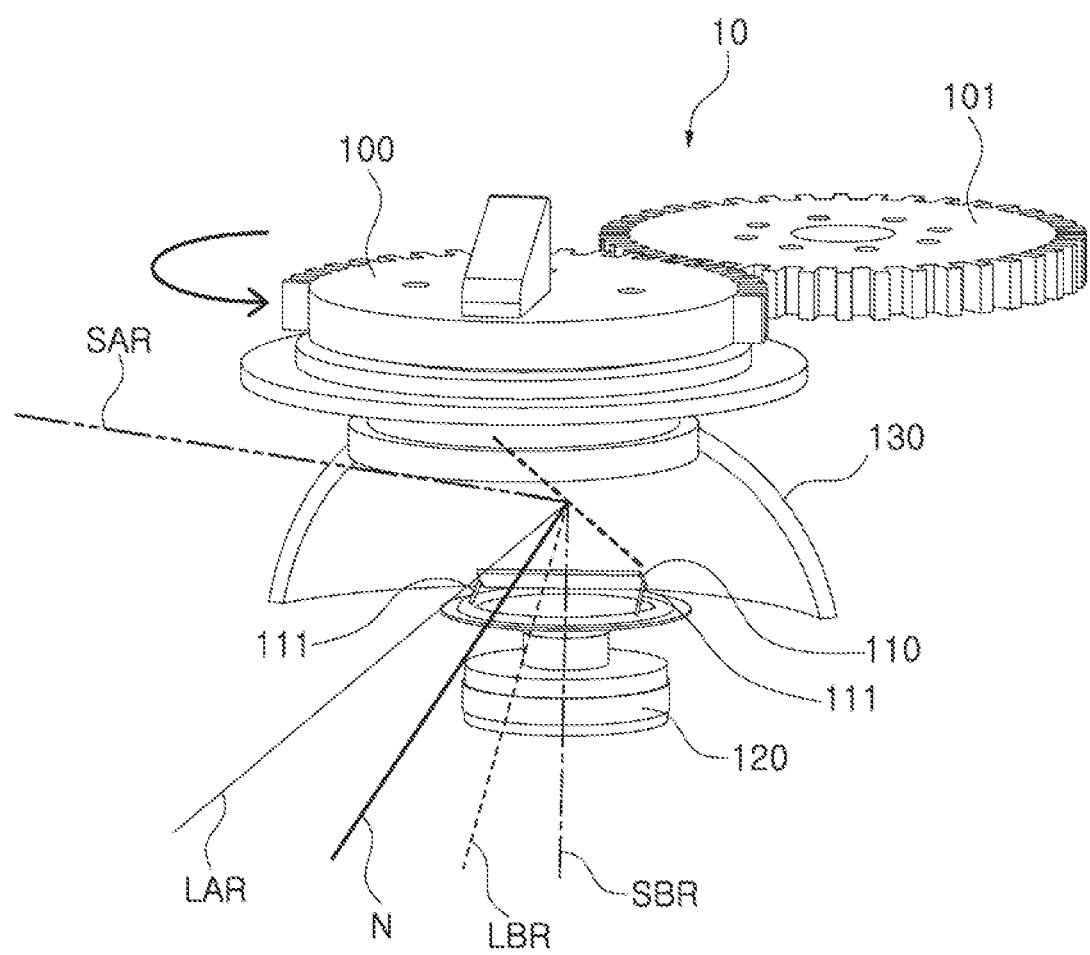
FIG. 8 is a perspective view illustrating the state in which a module gear unit has been rotated in the media module according to an embodiment of the present disclosure.
Figure 9:
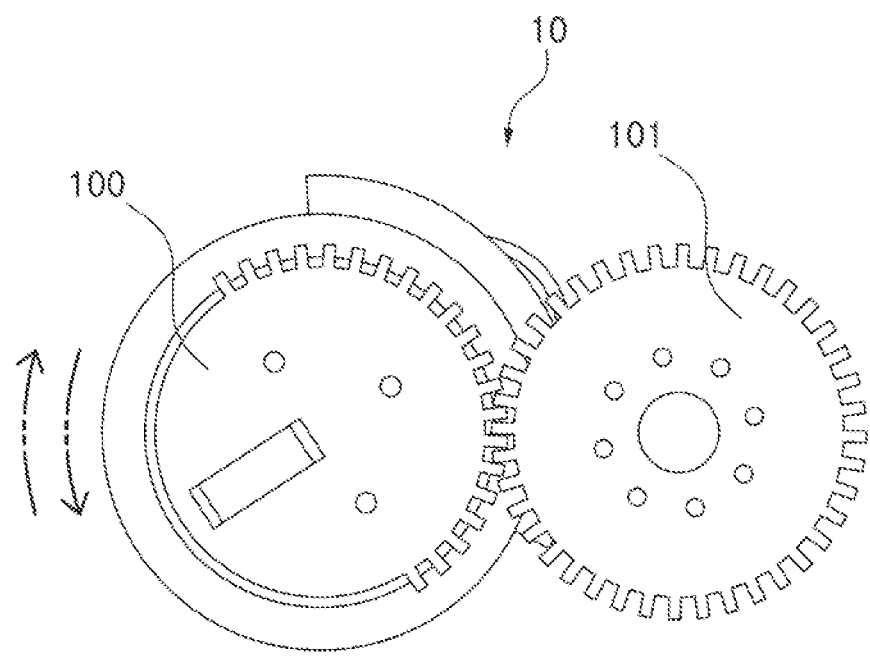
FIG. 9 is a plan view illustrating the state in which the module gear unit has been rotated in the media module according to an embodiment of the present disclosure.
Figure 10:
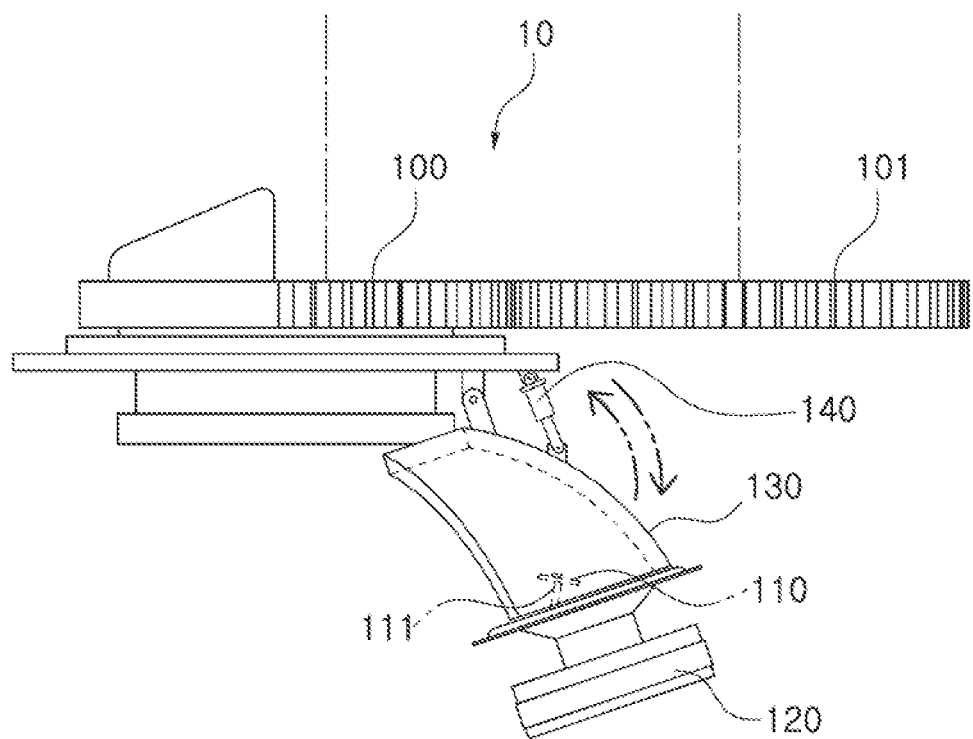
FIG. 10 is a side view illustrating the state in which a reflection plate has been rotated with respect to the module gear unit in the media module according to an embodiment of the present disclosure.
Figure 11:
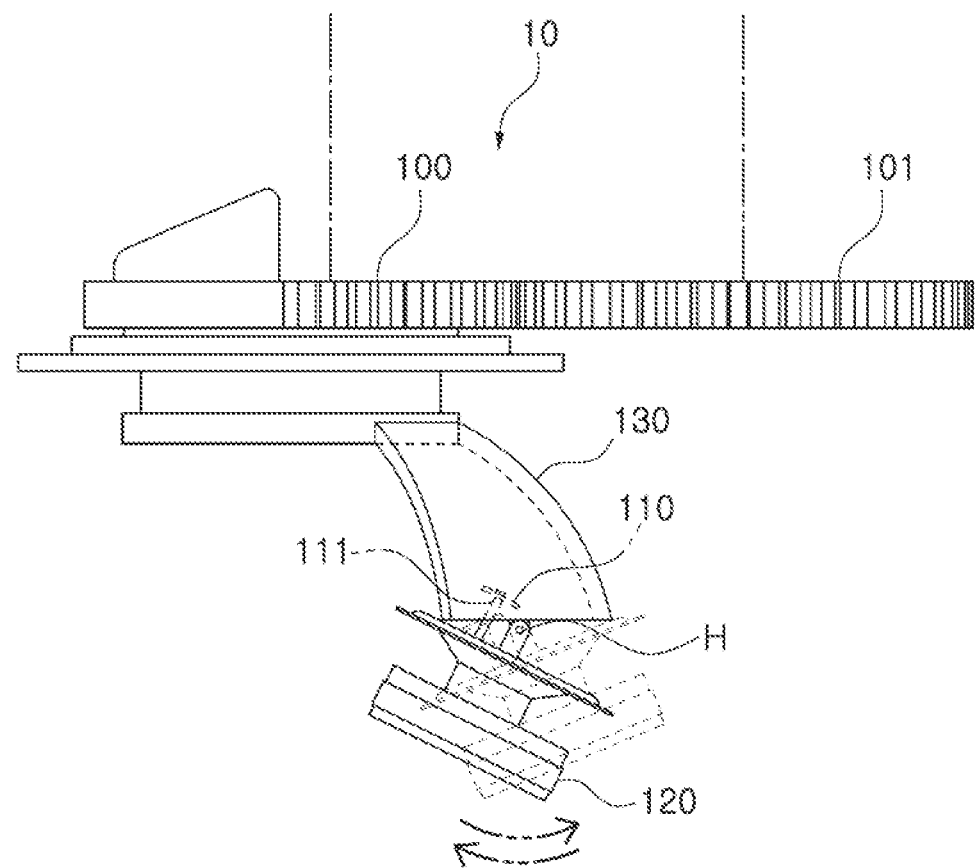
FIG. 11 is a side view illustrating the state in which a speaker has been rotated with respect to a reflection plate in the media module according to an embodiment of the present disclosure.
Figure 12:
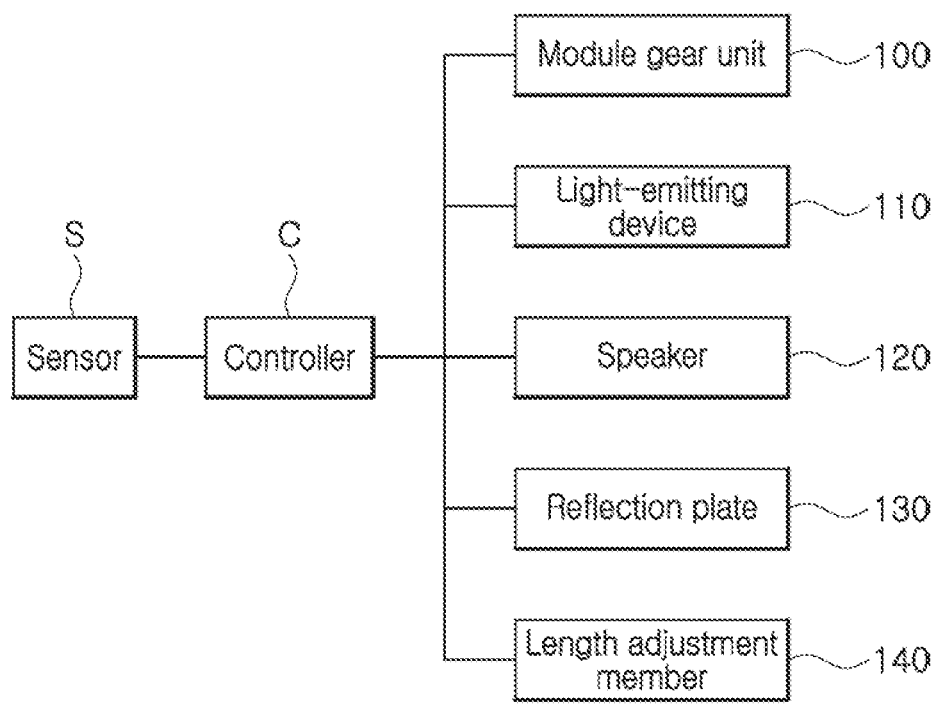
FIG. 12 is a block diagram of the media module according to an embodiment of the present disclosure.
Figure 13:
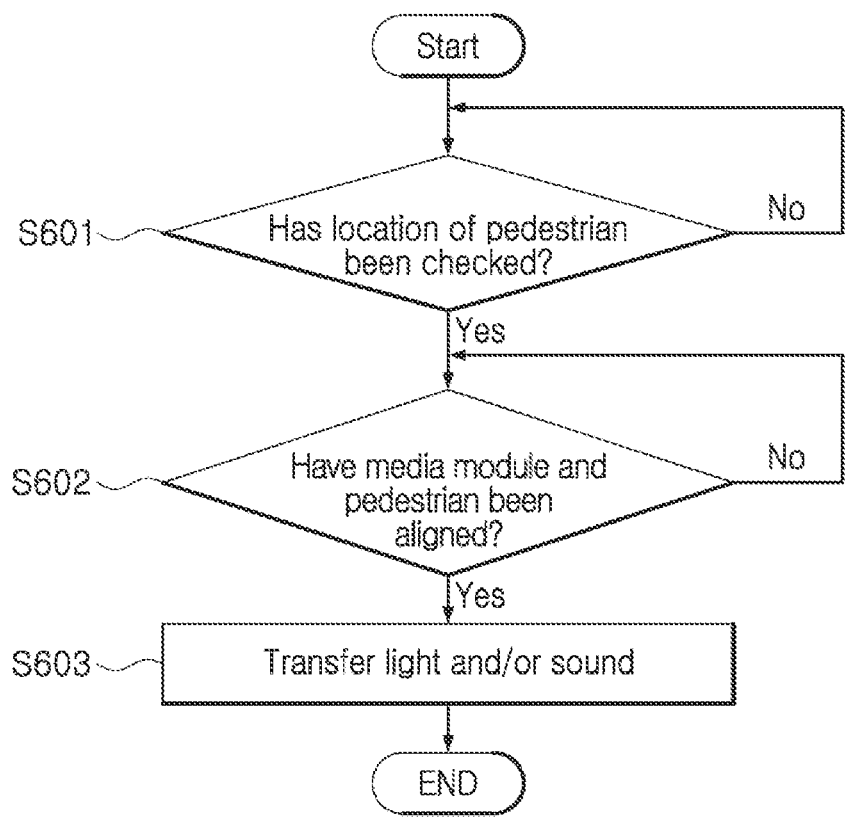
FIG. 13 is a flowchart of a method of controlling the media module according to an embodiment of the present disclosure.

FIG. 1 is a perspective view of a vehicle including a media module according to an embodiment of the present disclosure. FIG. 2 is a perspective view illustrating the state in which a pedestrian is present around the vehicle according to an embodiment of the present disclosure. FIG. 3 is a plan view illustrating the state in which a pedestrian is present around the vehicle according to an embodiment of the present disclosure. FIG. 4 is a side view of the vehicle according to an embodiment of the present disclosure. FIG. 5 is a perspective view of the media module according to an embodiment of the present disclosure. FIG. 6 is a side view of the media module according to an embodiment of the present disclosure. FIG. 7 is a plan view of the media module according to an embodiment of the present disclosure. FIG. 8 is a perspective view illustrating the state in which a module gear unit has been rotated in the media module according to an embodiment of the present disclosure. FIG. 9 is a plan view illustrating the state in which the module gear unit has been rotated in the media module according to an embodiment of the present disclosure. FIG. 10 is a side view illustrating the state in which a reflection plate has been rotated with respect to the module gear unit in the media module according to an embodiment of the present disclosure. FIG. 11 is a side view illustrating the state in which a speaker has been rotated with respect to a reflection plate in the media module according to an embodiment of the present disclosure. FIG. 12 is a block diagram of the media module according to an embodiment of the present disclosure. FIG. 13 is a flowchart of a method of controlling the media module according to an embodiment of the present disclosure.

Referring to FIGS. 1 to 13, a vehicle 1 according to an embodiment of the present disclosure may include a media module 10. The media module 10 may be disposed in the vehicle 1, may transmit light including a lighting signal in several directions, such as the front, side, rear, and upward of the vehicle 1, and may transmit a sound including an acoustic signal in several directions, such as the front, side, rear, and upward of the vehicle 1.

A sensor S of the media module 10 may measure whether a pedestrian P is present around the vehicle 1 and a location of the pedestrian P when the pedestrian P is present. A controller C of the media module 10 may control operations of various devices of the media module 10 based on information measured by the sensor S. The sensor S and the controller C may be provided in the media module 10. A sensor and controller of another device not the media module 10 may be used as the sensor S and the controller C. In this case, the pedestrian P includes all of objects capable of receiving signal information transmitted by the vehicle, such as a two-wheeler rider, in addition to the pedestrian.

The sensor S may be constructed as various types of sensors, including a camera, an infrared camera, RADAR, LiDAR, and an ultrasonic sensor.

The controller C may control the media module 10 to emit light and/or an acoustic signal toward the pedestrian, based on a checked relative location between the vehicle 1 and the pedestrian P.

The media module 10 may include a first media module 11 and a second media module 12. The first media module 11 and the second media module 12 may be disposed on the right and left sides of the vehicle 10, respectively. Detailed constructions of the first media module 11 and the second media module 12 may be the same.

The sensor S may detect a location of the pedestrian P. The controller C may check a relative location between the detected location of the pedestrian P and the vehicle 1 through the sensor S.

The controller C may control various devices of the media module 10, may generate light and a sound, and may transmit the light and sound toward the pedestrian P.

In the following description, the path of light before being reflected by a reflection plate 130 after being generated by a light-emitting device 110 is defined as a "light path before reflection (LBR)". The path of light that is generated by the light-emitting device 110 and then reflected by the reflection plate 130 is defined as a "light path after reflection (LAR)". The path of a sound before being reflected by the reflection plate 130 after being generated by a speaker 120 is defined as a "sound path before reflection (SBR)". The path of a sound that is generated by the speaker 120 and then reflected by the reflection plate 130 is defined as a "sound path after reflection (SAR)".

The LAR may be directed toward the surface of the earth. The SAR may be directed toward the face of the pedestrian P, in particular, the ear of the pedestrian P. The pedestrian P may recognize light that is reflected by the surface of the earth, and may listen to a sound toward his or her face. Accordingly, the pedestrian P may recognize information, such as the presence of the vehicle 1 or the direction of progress.

Referring to FIG. 3, light that is generated by the media module 10 may be radiated toward the surface of the earth between the pedestrian P and the vehicle 1. Light that is generated by the media module 10 may be radiated toward the front (e.g., ahead of the feet of the pedestrian P) of the pedestrian P.

As described above, as light is radiated toward the surface of the earth between the pedestrian P and the vehicle 1, the pedestrian P can receive information (e.g., the direction of progress and whether the vehicle moves) on the vehicle 1 through the light radiated to the surface of the earth in the form of visual information. Accordingly, the pedestrian P can be aware that the signal that is generated by the vehicle 1 is a message toward the pedestrian P himself or herself.

Referring to FIG. 4, a sound that is generated by the media module 10 may be transferred toward the pedestrian P.

As described above, as a sound is transferred toward the pedestrian P, in particular, the face of the pedestrian P, pedestrians other than the pedestrian P may listen to the sound low or may not listen to the sound. Accordingly, the pedestrian P can be aware that the signal that is generated by the vehicle 1 is a message toward the pedestrian P himself or herself. Furthermore, the sound may not act on another pedestrian other than the pedestrian P as noise pollution.

Referring to FIGS. 4 and 5, when from a point on the lower part of the reflection plate 130 to a point on the upper part of the reflection plate 130 is extended as a virtual line, the normal N of the virtual line, that is, the normal N of a reflection surface of the reflection plate 130, may be disposed so that the normal N is directed toward the surface of the earth.

A sound and light that are generated by the media module 10 may be transferred toward the pedestrian P after being reflected by the reflection surface. A first incident angle that is formed by the normal N of the reflection surface and the LBR may be smaller than a second incident angle that is formed by the normal N of the reflection surface and the SBR on the basis of the normal N of the reflection surface by which the sound and light are reflected.

Accordingly, the angle of reflection of the LAR may be smaller than the angle of reflection of the SAR. The SBR, the LBR, the SAR, and the LAR are described with reference to FIGS. 4 to 6.

Referring to FIGS. 5 to 7, the media module 10 according to an embodiment of the present disclosure may include a module gear unit 100, the light-emitting device 110, the speaker 120, and the reflection plate 130.

The module gear unit 100 may be rotatably installed in the vehicle body, for example, a module housing (MH) on which the media module 10 is mounted. The module gear unit 100 may be directly coupled to a motor (M), and may be rotated by the rotational driving of the motor M.

The media module 10 according to an embodiment of the present disclosure may further include a rotation driving gear (or rotation gear) 101. The rotation driving gear 101 is engaged with the module gear unit 100, and provides the module gear unit 100 with a rotational power provided by the motor M. Accordingly, as the rotation driving gear 101 is rotated by the rotational driving of the motor M, the module gear unit 100 may also be rotated. Accordingly, the SAR and the LAR may be changed from side to side.

The media module 10 may further include the sensor S and the controller C. The sensor S measures a location of the pedestrian P around the vehicle 1. The controller C controls various operations of the media module 10, including a rotational operation of the module gear unit 100, based on information on a location of the pedestrian P, which is measured by the sensor S. The sensor S may be set to measure a location of the pedestrian P within a set distance area, when measuring the location of the pedestrian P around the vehicle 1.

The module gear unit 100 may be connected to the reflection plate 130 on the lower side thereof. The module gear unit 100 may include a gear part engaged with the rotation driving gear 101 on the upper side thereof, and may include a connection part connected to the reflection plate 130 under the gear part.

Angles that are formed by the module gear unit 100 and the reflection plate 130 may be fixed as in FIG. 6. Furthermore, the angles that are formed by the module gear unit 100 and the reflection plate 130 may be adjusted as in FIG. 10. That is, the reflection plate 130 may be constructed to be rotated with respect to the module gear unit 100.

When the reflection plate 130 is rotated with respect to the module gear unit 100 as in FIG. 10, the speaker 120 and the light-emitting device 110 that are connected to the reflection plate 130 are also rotated with respect to the module gear unit 100. Accordingly, the SAR and the LAR may be changed. That is, the SAR and the LAR may be adjusted on the basis of the pedestrian P who is located farther from or closer to the vehicle 1, which is a target.

The speaker 120 generates a sound including an acoustic signal. The sound generated by the speaker 120 is incident toward the reflection plate 130. The sound reflected by the reflection plate 130 is transmitted toward the place toward which the reflection plate 130 is directed.

The speaker 120 may be disposed to face the reflection surface of the reflection plate 130. The speaker 120 may be directly connected to the reflection plate 130, and may be connected to the reflection plate 130 by another member or another method.

Angles that are formed by the speaker 120 and the reflection plate 130 may be fixed as in FIG. 6. Furthermore, the angles that are formed by the speaker 120 and the reflection plate 130 may be adjusted as in FIG. 11. That is, the speaker 120 may be constructed to be rotated with respect to the reflection plate 130 through the axis of rotation H. Accordingly, the SAR may be changed. That is, the SAR may be adjusted on the basis of the pedestrian P who is located farther from or closer to the vehicle 1, which is a target.

The light-emitting device 110 generates light including a lighting signal. Light that is generated by the light-emitting device 110 is incident toward the reflection plate 130. Light reflected by the reflection plate 130 is transmitted toward the place toward which the reflection plate 130 is directed.

The light-emitting device 110 may be disposed to face the reflection surface of the reflection plate 130. The light-emitting device 110 may be directly connected to the reflection plate 130, and may be connected to the reflection plate 130 by another member or another method. FIG. 5 illustrates an example in which the light-emitting device 110 is indirectly coupled to the reflection plate 130 through the speaker 120 as the light-emitting device 110 is connected to the speaker 120 by a fixing member 111. However, as described above, a method of coupling the light-emitting device 110 and the reflection plate 130 is not limited to the example.

Angles that are formed by the light-emitting device 110 and the reflection plate 130 may be fixed as in FIG. 6. Furthermore, the angles that are formed by the light-emitting device 110 and the reflection plate 130 may be adjusted as in FIG. 11. That is, the light-emitting device 110 may be constructed to be rotated with respect to the reflection plate 130 through the axis of rotation H. Accordingly, the LAR may be changed. That is, the LAR may be adjusted on the basis of the pedestrian P who is located farther from or closer to the vehicle 1, which is a target.

A point at which light generated by and/or emitted from the light-emitting device 110 is reflected by the reflection plate 130 and a point at which a sound generated by and/or output from the speaker 120 is reflected by the reflection plate 130 may be the same or may be different from each other. A reflection surface, which may be an internal surface, of the reflection plate 130 by which light and the sound are reflected may be formed to have a curved surface.

The LBR of light generated by the light-emitting device 110 and the SBR of a sound generated by the speaker 120 are incident on the reflection plate 130 at different incident angles. Accordingly, the directions toward which the light and the sound are directed are different from each other.

Accordingly, the LAR of light generated by the light-emitting device 110 may be directed toward the surface of the earth. The SAR of a sound generated by the speaker 120 may be directed toward the pedestrian not the surface of the earth.

For example, when an angle that is formed by the LBR and the normal N of the reflection surface is smaller than an angle that is formed by the SBR and the normal N of the reflection surface, the LAR may be directed toward the surface of the earth, and the SAR may be directed toward the ground.

Referring to FIGS. 8 and 9, the module gear unit 100 may be constructed to be engaged with the rotation driving gear 101. The module gear unit 100 may be rotated by the rotation of the rotation driving gear 101.

When the rotation driving gear 101 is rotated counterclockwise, the module gear unit 100 may be rotated clockwise. Furthermore, when the rotation driving gear 101 is rotated clockwise, the module gear unit 100 may be rotated counterclockwise.

As the module gear unit 100 is rotated, the directions of the SAR and the LAR may be changed, and a signal may be transmitted toward the pedestrian P, that is, a target. Accordingly, visual and auditory pollution may not act on another pedestrian other than the pedestrian P. Furthermore, a signal can be accurately transmitted to the pedestrian P, that is, a target.

Referring to FIG. 10, in the media module 10, the reflection plate 130 may be constructed to be rotated with respect to the module gear unit 100. The light-emitting device 110 and the speaker 120 are connected to the module gear unit 100 through the reflection plate 130. Accordingly, when the reflection plate 130 is rotated, both the light-emitting device 110 and the speaker 120 may be rotated at the same angle.

As the light-emitting device 110, the speaker 120, and the reflection plate 130 are constructed to be rotated perpendicularly to the module gear unit 100, the direction of the SAR of a sound that is generated by the speaker 120 and reflected by the reflection plate 130 and/or the direction of the LAR of light that is generated by the light-emitting device 110 and reflected by the reflection plate 130 may be changed. Accordingly, light and/or a sound can be accurately transmitted to the pedestrian P who is located at a distance far from the vehicle 1 or at a distance close to the vehicle 1.

According to an embodiment, the module gear unit 100 and the reflection plate 130 may be connected by a length adjustment member 140. As the length of the length adjustment member 140 is changed, an angle at which the reflection plate 130 has been installed with respect to the module gear unit 100 may be adjusted. Accordingly, an angle that is formed by the reflection plate 130 and the module gear unit 100 in FIG. 10 may be greater or smaller than an angle that is formed by the reflection plate 130 and the module gear unit 100 in FIG. 6. The length adjustment member 140 may have rotation shafts at a portion at which the length adjustment member 140 is connected to the module gear unit 100 and a portion at which the length adjustment member 140 is connected to the reflection plate 130. An operation of the length adjustment member 140 may be controlled by the controller C.

Referring to FIG. 11, the light-emitting device 110 and/or the speaker 120 may be constructed to be rotated or moved with respect to the reflection plate 130. The speaker 120 may be rotatably connected to the reflection plate 130 through the axis of rotation H. The light-emitting device 110 is connected to the speaker 120. Accordingly, when the speaker 120 is rotated with respect to the reflection plate 130, the light-emitting device 110 may also be rotated at the same angle as the speaker 120.

As the light-emitting device 110 and/or the speaker 120 are constructed to be rotated or moved with respect to the reflection plate 130, the direction of the SAR of a sound that is generated by the speaker 120 and reflected by the reflection plate 130 and/or the direction of the LAR of light that is generated by the light-emitting device 110 and reflected by the reflection plate 130 may be changed.

Accordingly, light and/or a sound can be accurately transmitted to the pedestrian P, that is, a target, based on a distance between the vehicle 1 and the pedestrian P.

In FIG. 11, the speaker 120 is rotatably connected to the reflection plate 130 through the axis of rotation H, but may be rotatably or movably connected to the reflection plate 130 through the length adjustment member 140 illustrated in FIG. 10. Accordingly, the speaker 120 and the light-emitting device 110 may be movably adjusted with respect to the reflection plate 130, so that the SAR and the LAR can be adjusted.

The speaker 120 may be equipped with a motor (not illustrated) in order to provide a rotational power having the axis of rotation H as its center of rotation. An operation of the motor or an operation of the length adjustment member 140 may be controlled by the controller C.

Since the angles at which the speaker 120 and the reflection plate 130 are installed are adjusted, that is, since the location of a reflection point of the reflection plate 130 by which a sound is reflected is changed, the direction of the SAR of a sound that is generated by the speaker 120 and reflected by the reflection plate 130 can be adjusted.

Since the angles at which the light-emitting device 110 and the reflection plate 130 are installed are adjusted, that is, since the location of a reflection point of the reflection plate 130 by which light is reflected is changed, the direction of the LAR of light that is generated by the light-emitting device 110 and reflected by the reflection plate 130 can be adjusted.

Referring to FIG. 13, the method of controlling the media module according to an embodiment of the present disclosure includes a step of checking a location of the pedestrian P around the vehicle 1 through the sensor S, a step of aligning the media module 10 to (or toward) the pedestrian P based on information on the location of the pedestrian P, which is measured by the sensor S, so that the media module 10 is directed toward the pedestrian P, and a step of transmitting at least one of light and a sound toward the pedestrian P by controlling the media module 10.

The controller C may control the sensor S to detect the pedestrian P around the vehicle 1. The controller C may calculate a relative location between the pedestrian P detected by the sensor S and the vehicle 1 (S601).

When the pedestrian P is not detected within a predetermined range around the vehicle 1, the controller C may continuously measure whether the pedestrian P is present within the predetermined range through the sensor S. When the pedestrian P is detected within the predetermined range around the vehicle 1, the controller C may align the media module 10 to the pedestrian P so that light that is generated by the light-emitting device 110 and a sound that is generated by the speaker 120 are directed toward the pedestrian P (S602).

The step of aligning the media module 10 and the pedestrian P so that the media module 10 is directed toward the pedestrian P may include a step of rotating, by the controller C, the module gear unit 100 so that at least one of light that is reflected by the reflection plate 130 and a sound that is reflected by the reflection plate 130 is directed toward the pedestrian P.

The controller C may control a rotational operation of the module gear unit 100 through the motor M and the rotation driving gear 101, or may directly control a rotational operation of the module gear unit 100 through the motor M. Accordingly, the media module 10 can be aligned so that the media module 10 is directed toward the pedestrian P.

The step of aligning the media module 10 to the pedestrian P so that the media module 10 is directed toward the pedestrian P may further include a step of rotating, by the controller C, the reflection plate 130 with respect to the module gear unit 100.

The step of aligning the media module 10 and the pedestrian P so that the media module 10 is directed toward the pedestrian P may further include a step of rotating, by the controller C, the light-emitting device 110 and the speaker 120 with respect to the reflection plate 130.

The controller C may control operations of the light-emitting device 110, the speaker 120, and the reflection plate 130. Operational control of the controller C includes all of a series of operations, such as an operation of generating light from the light-emitting device 110 and generating a sound from the speaker 120 and an operation of rotating or moving the light-emitting device 110, the speaker 120, and the reflection plate 130. For example, the controller C may control operations of the module gear unit 100 and the length adjustment member 140.

When determining that the media module 10 and the pedestrian P have been aligned so that the media module 10 is directed toward the pedestrian P, the controller C may control the light-emitting device 110 and the speaker 120 to generate light and a sound and to transmit the light and the sound toward the pedestrian P (S603).

As described above, as the media module 10 transmits light and a sound toward the pedestrian P, a signal from a vehicle rider can be accurately transferred to the pedestrian P, that is, a target, and image pollution and noise pollution may not act on another pedestrian that is not a target.

The present disclosure has been described above based on the embodiments illustrated in the accompanying drawings, but the embodiments are merely illustrative. A person having ordinary knowledge in the art to which the present disclosure pertains will understand that various modifications and other equivalent embodiments are possible from the embodiments.

Accordingly, the technical range of protection of the present disclosure should be determined by the claims.

What is claimed is:
1. A media module comprising:
a module gear unit rotatably disposed at a vehicle;
a reflection plate connected to the module gear unit and having a reflection surface;
a light-emitting device facing the reflection surface of the reflection plate and configured to emit light; and
a speaker facing the reflection surface of the reflection plate and configured to output a sound, wherein the light emitted from the light-emitting device and the sound output from the speaker are incident toward the reflection plate, and wherein the light-emitting device and the speaker are rotatable or movable with respect to the reflection plate.

2. The media module of claim 1, further comprising a rotation gear engaged with the module gear unit and configured to produce a rotational motion to the module gear unit.

3. The media module of claim 1, wherein:
the light emitted from the light-emitting device is incident toward the reflection plate at a first incident angle, and
the sound output from the speaker is incident toward the reflection plate at a second incident angle different from the first incident angle.

4. The media module of claim 3, wherein the first incident angle is smaller than the second incident angle.

5. The media module of claim 1, wherein the reflection plate has a curved reflection surface configured to reflect the light emitted from the light-emitting device and the sound output from the speaker.

6. The media module of claim 1, wherein the reflection plate is rotatable with respect to the module gear unit.

7. The media module of claim 1, further comprising:
a sensor configured to measure a location of a pedestrian around a vehicle; and
a controller configured to control a rotational operation of the module gear unit based on the measured location of the pedestrian.

8. A method of outputting a media to a pedestrian around a vehicle, the method comprising:
causing a sensor to measure a location of the pedestrian around the vehicle;
aligning, based on the measured location of the pedestrian, a media module to the pedestrian such that the media module is directed toward the pedestrian; and
controlling the media module to output at least one of light and a sound toward the pedestrian,
wherein the media module comprises:
a module gear unit rotatably disposed at the vehicle;
a reflection plate connected to the module gear unit and having a reflection surface;
a light-emitting device facing the reflection surface of the reflection plate and configured to emit light; and
a speaker facing the reflection surface of the reflection plate and configured to output a sound, and
wherein aligning the media module to the pedestrian comprises rotating or moving the light-emitting device and the speaker with respect to the reflection plate.

9. The method of claim 8, wherein controlling the media module comprises directing the light emitted from the light-emitting device and the sound output from the speaker to be incident toward the reflection plate.

10. The method of claim 9, wherein aligning the media module to the pedestrian comprises rotating the module gear unit so that at least one of the light and the sound reflected by the reflection plate is directed toward the pedestrian.

11. The method of claim 10, wherein aligning the media module to the pedestrian comprises:
directing the light emitted from the light-emitting device to be incident toward the reflection plate at a first incident angle, and
directing the sound output from the speaker to be incident toward the reflection plate at a second incident angle different from the first incident angle.

12. The method of claim 10, wherein aligning the media module to the pedestrian comprises rotating the reflection plate with respect to the module gear unit.

13. A vehicle comprising a media module which comprises:
a module gear unit rotatably disposed at the vehicle;
a reflection plate connected to the module gear unit and having a reflection surface;
a light-emitting device facing the reflection surface of the reflection plate and being configured to emit light; and
a speaker facing the reflection surface of the reflection plate and being configured to output a sound,
wherein the light emitted from the light-emitting device and the sound output from the speaker are incident toward the reflection plate, and
wherein the light-emitting device and the speaker are rotatable or movable with respect to the reflection plate.

* * * * *